United States Patent
Roddis

(10) Patent No.: US 7,905,496 B2
(45) Date of Patent: Mar. 15, 2011

(54) BEARING PROTECTOR FOR AXIAL SHAFT MOVEMENT

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 674 days.

(21) Appl. No.: 11/736,697

(22) Filed: Apr. 18, 2007

(65) Prior Publication Data
US 2007/0241513 A1    Oct. 18, 2007

(30) Foreign Application Priority Data

Apr. 18, 2006 (GB) .................................. 0607513.9

(51) Int. Cl.
*F16J 15/447* (2006.01)
(52) U.S. Cl. .................... 277/425; 277/433; 277/925
(58) Field of Classification Search ................ 277/346, 277/411, 412, 418–421, 425, 433, 925
See application file for complete search history.

(56) References Cited

U.S. PATENT DOCUMENTS

| | | | | |
|---|---|---|---|---|
| 4,706,968 A | * | 11/1987 | Orlowski | 277/347 |
| 5,378,000 A | | 1/1995 | Orlowski | |
| 5,498,006 A | | 3/1996 | Orlowski | |
| 5,951,020 A | * | 9/1999 | Orlowski | 277/419 |
| 6,311,984 B1 | * | 11/2001 | Orlowski | 277/418 |
| 6,557,856 B1 | * | 5/2003 | Azibert et al. | 277/401 |
| 7,461,846 B2 | * | 12/2008 | Chitren | 277/347 |
| 7,521,827 B2 | * | 4/2009 | Orlowski et al. | 310/68 R |
| 2006/0087084 A1 | * | 4/2006 | Chitren et al. | 277/411 |
| 2007/0013142 A1 | * | 1/2007 | Chitren | 277/411 |
| 2007/0145690 A1 | * | 6/2007 | Chitren et al. | 277/411 |
| 2007/0222158 A1 | * | 9/2007 | Roddis | 277/345 |
| 2008/0014076 A1 | * | 1/2008 | Roddis et al. | 415/174.2 |
| 2008/0050261 A1 | * | 2/2008 | Roddis | 418/104 |

FOREIGN PATENT DOCUMENTS

| | | | | |
|---|---|---|---|---|
| GB | 0415548 | | | 1/2006 |
| GB | 2431440 | A | * | 4/2007 |
| GB | 2438022 | A | * | 11/2007 |
| WO | WO2006/005950 | A2 | * | 1/2006 |

* cited by examiner

*Primary Examiner* — Shane Bomar
*Assistant Examiner* — Gilbert Y Lee
(74) *Attorney, Agent, or Firm* — Edwin D. Schindler

(57) ABSTRACT

A seal device, which accommodates axial displacement between a housing and shaft of an item of rotating equipment, includes a stator which locates into the housing of a piece of rotating equipment. A first rotor locates on the shaft of the rotating equipment and a second rotor is rotationally coupled to the first rotor with the first rotor being permitted to axially float with respect to the second rotor. The device provides sealing integrity when the shaft is both idle and operational. The sealing device may be used, for instance, in a double ended centrifugal pump where shaft displacement occurs from thermal expansion.

12 Claims, 3 Drawing Sheets

BEARING PROTECTOR FOR AXIAL SHAFT MOVEMENT

BACKGROUND OF THE INVENTION

1. Technical Field of the Invention

Figure 1:
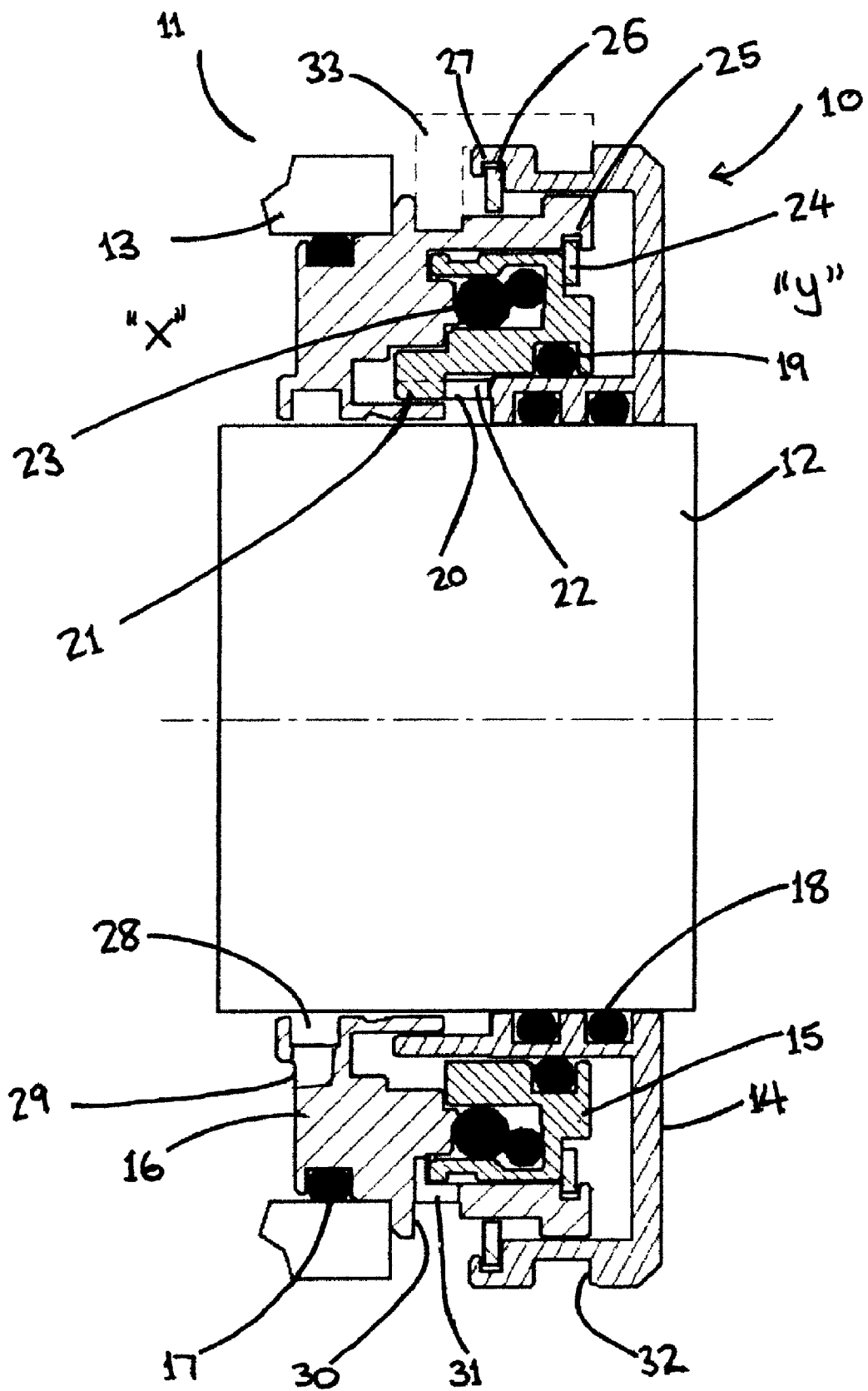

This invention relates to bearing protectors, specifically of the non-contacting labyrinth seal type and their use in rotating equipment, especially equipment which provides axial movement between the rotor and stator.

2. Description of the Prior Art

An example of a piece of rotating equipment which has axial movement between the rotating shaft and stationary housing, is a double ended centrifugal pump with bearing assemblies supporting the rotating shaft, at either end of said shaft. During operation, thermal growth of the shaft often occurs and the pump design typically accommodates this by providing an axially fixed shaft end and an axially floating shaft end.

In such equipment, each bearing arrangement typically consists of at least one bearing housed in a bearing chamber. Said bearing is lubricated and sealed between the rotor to stator interface to prevent the ingress or egress of a fluid or solid to the bearing cavity, since such unwanted material results in the deterioration of equipment life.

Bearing seals are often also referred to as bearing protectors or bearing isolators. However, the use of such seals extends well beyond the protection of a bearing in rotating equipment. Accordingly, while reference will be made below to bearing protectors, it should be understood that this term is used, as far as the invention is concerned, in connection with devices having wider uses.

The purpose of a bearing protector is to prevent the ingress of fluid, solids and/or debris from entering a bearing chamber. Equally, bearing protectors are employed to prevent the egress of fluid or solids from a bearing chamber. Essentially, their purpose is to prevent the premature failure of the bearing.

Non-contacting bearing protectors can be of repeller or labyrinth configuration. Reference is made to our co-pending labyrinth seal bearing protection application GB0415548.7 discloses a substantially non-contacting bearing protector with a static shut off device.

In a non-contacting bearing protector, the rotating component typically has a complex outer profile which is located adjacent and in close radial and axial proximity to a complex inner profile of the stationary component. Together these complex profiles, in theory, provide a tortuous path preventing the passage of the unwanted materials or fluids.

Conventional labyrinth seal technology indicates the close by adjacent axial counter rotational members are substantially parallel to each other and run perpendicular to the centreline of the shaft. Unfortunately, labyrinth seal technology has limited effectiveness at discouraging fluid, specifically in applications such as double-ended centrifugal pumps where axial displacement is expected between the shaft and the housing.

Axial movement of a rotor to a stator with a close axial relationship can lead to contact and frictional heat generation.

It is therefore deemed advantageous if a mechanism is created which accommodates axial shaft movement of rotating equipment comprising of a non-contacting bearing protector whilst permitting the effective sealing of the bearing lubricant fluid at all times.

Several attempts have been made to satisfy this basic sealing requirement, including Orlowski, U.S. Pat. No. 5,498,006 which teaches a plurality of radial pins projecting from the stator into a corresponding groove in the rotor. Orlowski relies on the clearances between the walls of the pins and the width of the rotor groove, to accommodate axial movement between rotor and stator.

The experienced reader should note several technical drawbacks with Orlowski U.S. Pat. No. 5,498,006, as follows;

the radial pins do not form a continuous annular surface, adjacent to the corresponding annular surface of the rotor groove. This leads to accelerated wear of the pins. The worn particles from the pins are dispersed adjacent and into the sealed bearing lubrication fluid. Said contaminates deteriorate the lubrication media leading to premature bearing failure;

as the bearing seal in Orlowski U.S. Pat. No. 5,498,006 is installed into the equipment housing, the seal stator is pushed into the equipment housing stator via a suitable hydraulic press or pressing action. Given this action, the axial forces are transmitted from the rotor to the stator through the brittle pins, which can create irreversible damage, including pin breakage;

the axial clearance between the pins and the rotor groove, must be replicated at each axial location between the rotor and stator, otherwise rotor to stator contact will result. As axial movement of a double ended centrifugal pump can be typically +/−2 mm (+/−0.080"). Such axial clearances at all locations between the rotor and stator, of U.S. Pat. No. 5,498,006, compromise the sealing integrity of the teaching;

both Orlowski U.S. Pat. No. 5,498,006 and our co-pending application GB0415548.7 describe the importance of a sealing device, which provides sealing between the rotor and stator when the equipment is not in operation. Clearly, despite a requirement for such a device in bearing seals, the teaching described in Orlowski U.S. Pat. No. 5,498,006 is unable to accommodate said beneficial feature due to the way in which the large amount of axial movement accommodated within the device; and, typically, bearing seals incorporate a sealing elastomer between the seal stator and the equipment housing, however the sealable of the device in U.S. Pat. No. 5,498,006 has been compromised since said stator-housing seal has been omitted in preference of the plurality of radial pins. The reader will relate to the physical space constraints of the typical bearing seal installation and the limited alternate location of Orlowski plurality of radial pins, by design.

It is thus deemed to be further advantageous if said axial accommodating mechanism, incorporates a stator to rotor sealing device, which prevents vapour and/or moisture entry into the bearing chamber when the equipment is idle and not in operation.

Furthermore, it is deemed to be advantageous to provide a continuous annular surface between the rotor and stator given that the rotor may contact the stator, during installation or operation.

Lastly, an invention which maintains traditional labyrinth axial clearances, which are typically 0.2 mm (0.010") between the stator and rotor yet accommodates any amount of axial movement, including 4 mm (0.160"), is deemed advantageous given the dynamic sealing function is not compromised.

SUMMARY OF THE INVENTION

According to the present invention there is provided a bearing seal device, with an integral axial movement mechanism. The mechanism comprises two rotor members, the first connected to the equipment shaft and a second substantially adjacent to the stator member, the latter being connected to the equipment housing.

The axial movement mechanism, specifically the interface between the first and second rotor members, is designed to run substantially parallel to the shaft. Preferably, said first rotor member is rotationally connected to second rotor member, yet free to axially float.

Preferably, said first to second rotor connection is made by at least one drive member of one rotor engaging in at least one corresponding orifice/slot/hole of the other rotor.

Preferably the first rotor member is mounted in a frictional sealing engagement with the shaft by one or more elastomeric members. Said elastomeric member transmits the rotary motion from the shaft to the first rotor member.

Preferably, the second rotor member, houses a rotor to stator sealing device which, provides sealing integrity of the bearing seal between the rotor and stator when the equipment is idle. Preferably, said sealing device is an elastomeric member which disengages from the stator when the equipment is operational.

Preferably, the two rotor members forming the axial movement mechanism have an elastomeric member mounted in sealable engagement between said members. Preferably, said axially sliding elastomeric member is allowed to axially slide between two rotor surfaces, which run substantially parallel to the shaft. Preferably, said axially sliding elastomeric member is offered in a low coefficient of friction material.

Preferably the second rotor is positioned adjacent to the stator member. Preferably the second rotor is axially coupled to the stator, by a first axial constraint member. Preferably, said first axial constraint member has a circumferentially continuous surface in close proximity to a circumferentially continuous surface of the stator member and circumferentially continuous surface of the second rotor member.

Preferably said first rotor is permitted to axially float with respect to the stator, over a predefined axial range, and at the limits of the axial range, said first rotor is axially coupled to said stator, by one or more radially extending protrusions/members.

Preferably said first rotor is axially coupled to the stator by a second axial constraint member. Preferably, said second axial constraint member has a circumferentially continuous surface in close proximity to a circumferentially continuous surface of the stator member and circumferentially continuous surface of the first rotor member.

Preferably, said first and second axial constraint members are offered in a low friction material, which may either be wearable or durable/non-wearable. If a wearable material is offered, preferably said axial constraint member is sited out of the fluid media being sealed.

Preferably, said first rotor and said stator incorporates a radially extending cavity. Preferably, a removable or permanent setting clip is sited in said first rotor and stator cavities, thereby pre-setting the axial relationship between the aforementioned members.

Preferably, the stator is sealing connected to the equipment housing, by an elastomeric member. Preferably the stator is rotationally coupled to said equipment housing.

Preferably, said stator has a radially extending cavity, on its inner most radial surface adjacent to the rotor and/or shaft. At the approximate 6 o'clock position, said radial cavity is discontinued with an orifice that communicates with the bearing chamber of the rotating equipment.

Preferably, said stator has a radially extending cavity, on its outer most radial surface. At the approximate 6 o'clock position, said radial cavity is discontinued with an orifice that communicates with the atmospheric side of the bearing chamber of the rotating equipment.

BRIEF DESCRIPTION OF THE DRAWING FIGURES

Figure 2:
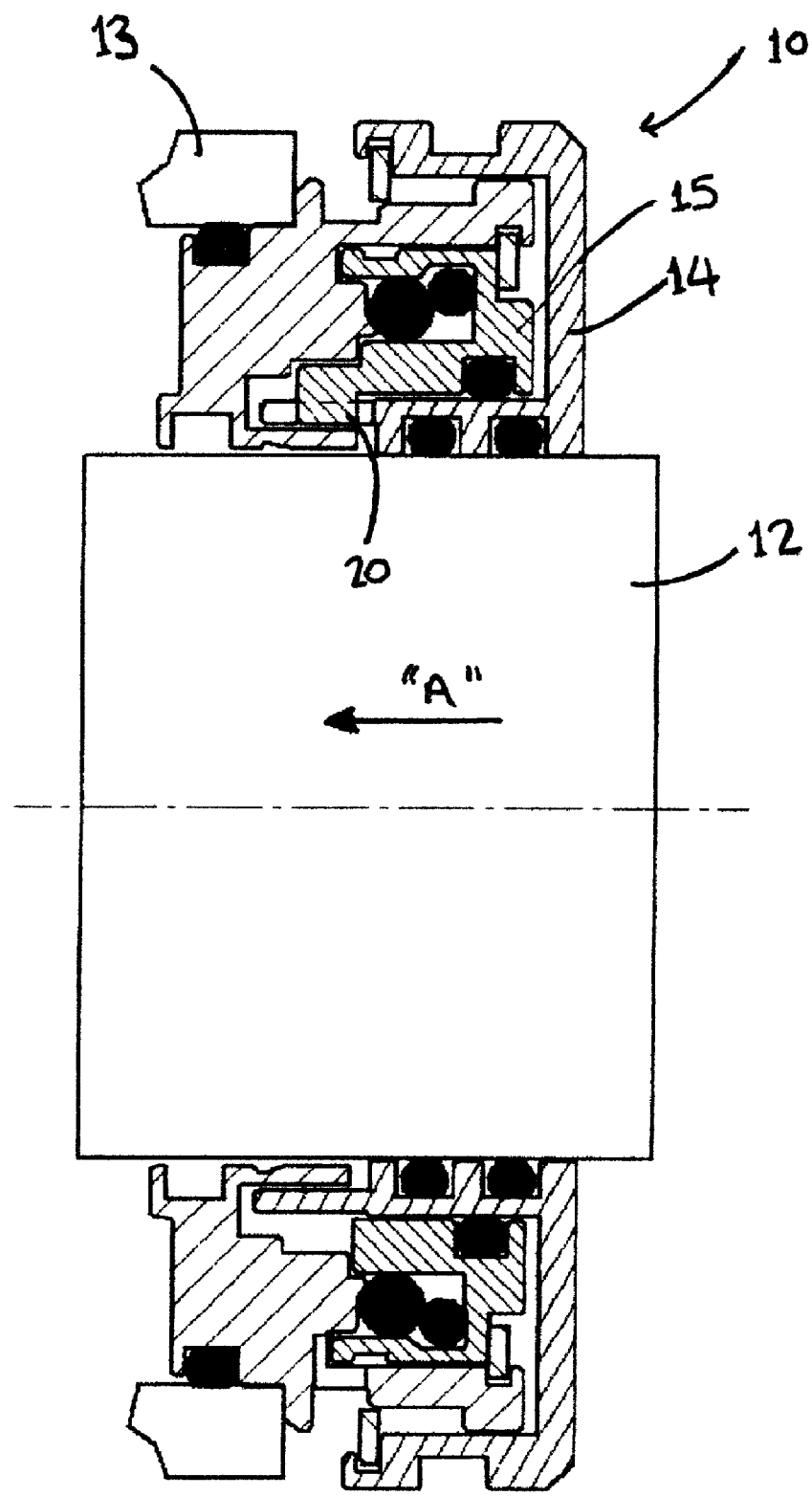
Figure 3:
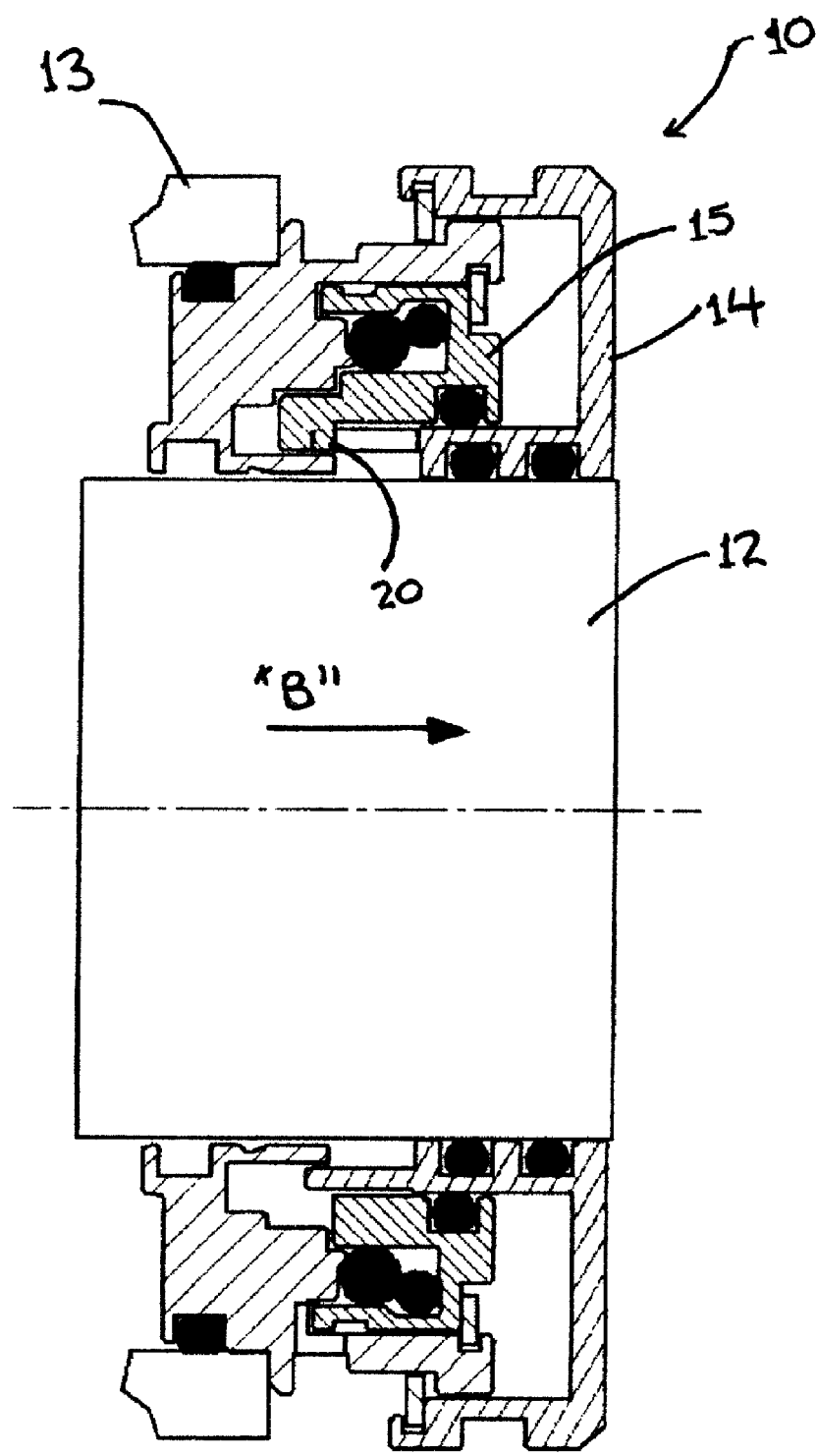

The accompanying drawing figures are as follows:

FIG. 1 is a longitudinal cross section view of a labyrinth seal bearing protector of the invention in its axially nominal position;

FIG. 2 corresponds to FIG. 1, and is a longitudinal cross section view of a labyrinth seal bearing protector of the invention in its axially closed position; and, FIG. 3 corresponds to FIG. 1, and is a longitudinal cross section view of a labyrinth seal bearing protector of the invention in its axially open position.

DETAILED DESCRIPTION OF THE DRAWING AND PREFERRED EMBODIMENTS

The invention will now be described, by way of examples only, with reference to the accompanying drawings.

The general principle of rotary seals in accordance with the present invention may be used not only in the case where the shaft is a rotary member and the housing is a stationary member but also the reverse situation, that is to say, in which the shaft is stationary and the housing is rotary.

Furthermore, the invention may be embodied in both rotary and stationary arrangements, cartridge and component seals with metallic components as well as non-metallic components.

Referring to FIG. 1 of the accompanying drawings, there is illustrated, a cross sectional view of a bearing protector 10 of the invention mounted in an item of rotating equipment 11.

The rotating equipment assembly 11 includes a rotating shaft 12 and a stationary equipment housing 13. The equipment housing 13 typically contains a bearing (not shown), mounted in the radial space between the shaft 12 and housing 13.

Area "X", adjacent to the bearing (not shown) and at one axial end of the bearing protector assembly 10 typically contains bearing lubrication fluid, yet could also contain solid and/or foreign debris and/or atmosphere. For clarity it will herewith be termed "product substance", being used to describe the single or mixed medium.

Area "Y" at the other axial end of the bearing protector assembly 10 could also partially contain fluid, typically sprayed moisture, and/or solids and/or foreign debris and/or atmosphere, however for clarity it will herewith be termed "atmospheric substance" being used to describe the single or mixed medium.

The bearing protector assembly 10 includes a first rotor member 14, and a second rotor member 15, which is radially and axially adjacent to stator member 16.

The stator member 16 is preferable rotationally attached to the equipment housing 13, in sealing engagement using elastomer member 17.

The first rotor 14 is radially mounted in sealing engagement with shaft 12 by at least one elastomeric member 18. The frictional squeeze on said elastomer 18 is typically sufficient to transmit the rotational drive from the shaft 12 to the first rotor 14. Clearly, a separate drive mechanism could be employed to transmit said drive if so required.

The second rotor 15 is radially mounted in sealing engagement with the first rotor 14 by at least one elastomeric member 19. The frictional squeeze on said elastomer 19 is typically sufficiently low to allow the axial displacement between the first rotor 14 and second rotor 15. Said elastomeric member 19 is preferably that of a solid deformable toroid, however could equally be that of a hollow deformable toroid or any form of sealing and/or radially engerising configuration such as a wiper member or lipseal. Preferably, any such member 19 is offered in a material with low co-efficient of friction property.

Rotational drive is preferably transmitted from the first rotor 14 to the second rotor 15 by a drive mechanism 20 comprising a second rotor drive lug 21 engaged in a first rotor drive slot 22. Said drive assembly is rotationally fixed yet allowed to axially float. Clearly a drive pin in a corresponding hole could be employed to transmit said drive if so required.

The static shut off device 23, which seals the rotor to stator when the shaft is at rest/idle and provides a non-contact seal when the shaft is in operation, is defined in our co-pending labyrinth seal bearing protection application GB0415548.7 and will not be further described. Clearly, the present invention may be offered with or without such a static shut off feature or an equivalent.

The second rotor 15 is axially restrained to the stator 16 by a first axial restraining member 24, which is axially restrained and radially extends from a groove 25 in stator 16. Preferably said axial restraining member 24 is offered in a material with low coefficient of friction property.

The first rotor 14 is preferably, although not essentially, axially restrained to the stator 16 by a second axial restraining member 26, which is axially constrained and radially extends from a groove 27 in first rotor 14. Preferably said axial restraining member 26 is offered in a material with low co-efficient of friction property.

Preferably stator 16 incorporates a radially extending groove 28 extending from the inner most circumference, and substantially adjacent to the rotor or shaft 12 as shown. Preferably said groove is positioned adjacent to area "X" and the sealed media in the equipment bearing chamber 11. Preferably said groove 28 is circumferentially discontinued at the 6 o'clock position by an orifice 29 which communicates between area "X" and the outer most radial surface of the groove 28.

Preferably stator 16 incorporates a radially extending groove 30 positioned adjacent to area "Y" and the atmospheric side of the equipment bearing chamber 11. Preferably said groove 30 is circumferentially discontinued at the 6 o'clock position by an orifice 31 which communicates between area "Y" and the inner most radial surface of the stator 16 adjacent to groove 30.

Preferably, the first rotor 14 incorporates a radially extending groove 32 positioned adjacent to area "Y" and the atmospheric side of the equipment bearing chamber 11.

Preferably, a removable setting clip 33 axially extends and thus provides a connection means from said stator groove 30 to said first rotor groove 32. Preferably, the axial width of the setting clip 33 is slightly greater than the axial width of either or both grooves 30 and 32.

The experienced reader will therefore see that the bearing protector 10 of the invention accommodates any given axial displacement of the shaft 12 to equipment housing 13, without compromising the sealability or integrity of the assembly.

Clearly, the invention anticipates and thus may accommodate any and all possible axial displacement situations of the shaft 12 to equipment housing 13.

The reader will note that non-contacting labyrinth seals rely on a close radial and axial clearances between the rotor 15 and stator 16, and the invention provides the innovative step of providing two rotor members, a first 14 axially floating and a second axially non-floating 15. Clearly a series of radially and axially extending castellations may be incorporated in all three counter rotational members, to create a tortuous path of resistance for fluid to pass.

The reader will appreciate the addition of the axial setting clips 33, given that when the bearing protector 10 is hydraulically, or otherwise, pressed into the equipment housing 13, said setting clips 33 transmit the pressing force whilst maintaining the desired axial clearances between the first rotor 14 and stator 16. Clearly, this configuration, permits the creation of any setting clip 33 axial length, to accommodate axial shaft 12 displacement in any one direction. For example, if axial shaft 12 displacement is anticipated in one direction only, say left to right with respect to the equipment housing 13, a short axial setting clip 33 is added to the assembly 10. If axial shaft 12 displacement is anticipated in the other direction only, say right to left, with respect to the equipment housing 13, a long axial setting clip 33 is added to the assembly 10.

FIG. 2 corresponds to FIG. 1 and is a longitudinal cross section view of the bearing protector 10 of the invention, in the axially compressed state, where shaft 12 displacement with respect to the equipment housing 13 has occurred in the direction of arrow "A", and thus first rotor 14 displaced right to left accordingly.

FIG. 3 corresponds to FIG. 1 and is a longitudinal cross section view of the bearing protector 10 of the invention, in the axially extended state, where shaft 12 displacement with respect to the equipment housing 13 has occurred in the direction of arrow "B", and thus first rotor 14 displaced left to right accordingly.

Clearly from FIGS. 2 and 3, at all phases of axial displacement, the first rotor 14 maintains rotational drive integrity to the second rotor 15, through drive assembly 20.

The embodiments of the invention, described and shown, clearly show innovative step and considerable advantages, over the existing prior art sealing, of rotating equipment, such as double ended centrifugal pumps, which, by their nature, have axial shaft to housing displacement.

What is claimed is:

1. A seal device, comprising;
   a stator which locates into a housing of a piece of rotating equipment, the piece of rotating equipment having a shaft;
   a first rotor which locates on the shaft of the piece of rotating equipment;
   a second rotor rotationally coupled to said first rotor with said first rotor axially moving with respect to said second rotor; and,
   at least one solid deformable toroid member positioned adjacent to said second rotor and said stator, said deformable toroid member sealingly engaging said second rotor and said stator when the shaft of the rotating equipment is idle and being sealingly disengaged from at least one of said first rotor, said second rotor and said stator when the shaft is rotating.

2. A seal device according to claim 1, wherein said first rotor is in sealing engagement with said second rotor, via at least one additional solid deformable toroid member.

3. A seal device according to claim 1, wherein said first rotor is for location in sealing engagement with the shaft of the piece of rotating equipment, via at least one additional solid deformable toroid member.

4. A seal device according to claim 1, wherein said first rotor and said second rotor are coupled together by at least one male protruding drive member engaging in a corresponding female orifice member.

5. A seal device according to claim 1, wherein said second rotor is axially restrained, yet rotationally free, relative to said stator, by an axial restraining member.

6. A seal device according to claim 1, further comprising an axial constraining member between said first rotor and said stator member.

7. A seal device according to claim 6, wherein said axial restraining member has a circumferentially continuous surface in close proximity to a circumferentially continuous surface of the said stator or said second rotor.

8. A seal device according to claim 1, further comprising at least additional one solid deformable toroid member in sealing engagement between said stator and the housing of the piece of rotating equipment.

9. A seal device according claim 1, wherein at least one radially extending cavity is provided, substantially adjacent to at least one of the shaft of the piece of rotating equipment, said first rotor and said second rotor, and adjacent to a sealed media of the piece of rotating equipment.

10. A seal device according to claim 9, wherein said radially extending cavity is circumferentially discontinued by an orifice that communicates between the sealed media and an outermost radial surface of the radially extending cavity.

11. A seal device according to claim 1, wherein said stator has an outermost radial surface that is circumferentially discontinued by an orifice that communicates between an atmospheric side of the piece of rotating equipment and an inner radial surface of said stator.

12. A seal device according to claim 1, further comprising a first sealing member between said first rotor and said second rotor having a substantially lower friction coefficient than a friction co-efficient between a second sealing member located between said first rotor and the shaft of the piece of rotating equipment.

* * * * *